United States Patent
Bartlett et al.

(12) 
(10) Patent No.: US 6,323,766 B1
(45) Date of Patent: Nov. 27, 2001

(54) VEHICLE HAZARD LIGHT SYSTEM

(76) Inventors: Ayona F. Bartlett; Timothy O. Bartlett, both of 214 Morgan Pkwy., Zebulon, NC (US) 27597

( * ) Notice: Subject to any disclaimer, the term of this patent is extended or adjusted under 35 U.S.C. 154(b) by 0 days.

(21) Appl. No.: 09/737,523

(22) Filed: Dec. 14, 2000

(51) Int. Cl.⁷ ..................................... B60Q 1/52
(52) U.S. Cl. .................. 340/471; 340/467; 340/475; 340/479
(58) Field of Search ..................... 340/463, 467, 340/468, 471, 475, 479

(56) References Cited

U.S. PATENT DOCUMENTS

| | | | |
|---|---|---|---|
| 4,107,647 | * | 8/1978 | Yoshino ........................ 340/467 |
| 4,320,384 | * | 3/1982 | Carlson ........................ 340/467 |
| 5,038,006 | * | 8/1991 | Lowe, Sr. et al. ............ 200/61.5 |
| 5,736,926 | * | 4/1998 | Winholtz ...................... 340/479 |

* cited by examiner

Primary Examiner—Daniel J. Wu
(74) Attorney, Agent, or Firm—Joseph N. Breaux

(57) ABSTRACT

An improved vehicle hazard light system that includes an impact sensor switch which activates the hazard blinker lights after an impact of a predetermined magnitude has been sensed. Because the impact could come from any direction, impact sensor switch is adpated to sense impacts from any direction.

1 Claim, 4 Drawing Sheets

PLASTIC CASE WITH PC BOARD & PENDULUM SWITCH

FLUID FILLED PENDULUM SWITCH

VEHICLE HAZARD LIGHT SYSTEM

TECHNICAL FIELD

The present invention relates to vehicle safety equipment and more particularly to an improved vehicle hazard light system that includes an impact sensor that triggers an automatic emergency flasher activation relay for automatically activating the emergency hazard flashers of a vehicle after an accident of greater than a predetermined magnitude has occurred. The improved hazard light system preferably also includes a triggering mechanism that is triggered by impacts from any direction.

BACKGROUND ART

Each year chain collision vehicle accidents occur when a driver in a car does not realize the vehicles in front of him/her have been involved in an accident and are at a dead stop in the road. This happens because many times the driver(s) of the vehicle(s) are injured and unable to activate the vehicle emergency flashers, in shock, disoriented and not thinking about activating the vehicle emergency flashers, and/or they are preoccupied with tending to injured people in their vehicle. It would of course be a benefit to these individuals and to drivers in general to have an improved vehicle hazard light system that included an impact sensor switch which would activate the hazard blinkers after an impact of a predetermined magnitude has been sensed. Because the impact could come from any direction, it would be a further benefit if the impact sensor switch could sense impacts from any direction.

GENERAL SUMMARY DISCUSSION OF INVENTION

It is thus an object of the invention to provide an improved vehicle hazard light system for use with hazard light systems that include a number of emergency flasher lights controlled by a flasher relay that is activated by a manually operated flasher relay activation switch in connection with a flasher relay activation input of a flasher relay such that, when the manually operated flasher relay activation switch is in a closed position, power is supplied to the flasher relay activation input causing the flasher relay to supply power intermittently to the number of flasher lights such that the number of flasher lights flash on and off. The improvement to the vehicle hazard light system includes the addition of an impact activated latching relay assembly including: a dual contact latching relay having first and second latching inputs for closing and maintaining first and second pairs of relay contacts of the dual contact latching relay in closed positions while electrical power is supplied to either or both of the first and second latching inputs; and a viscous fluid filled pendulum impact sensing switch including a sensing switch input connector having a first end in connection in electrical connection with an electrically conductive pendulum that is swivelly, pivotally suspended in a non-electrically conductive viscous fluid filled chamber and surrounded by an electrically conductive ring positioned within the viscous fluid filled chamber and having a sensor switch output connector in electrical connection therewith and positioned within the viscous fluid filled chamber such that when an electrically conductive pendulum mass portion of the electrically conductive pendulum swings a predetermined angle away from a center hanging position in any direction an electrical connection is formed between the sensing switch input connector and the sensing switch output connector; the viscosity of the fluid in the viscous fluid filled chamber and the size and mass of the electrically conductive mass of the pendulum mass portion being selected to determine a magnitude of impact required to cause the electrically conductive pendulum to swing through the viscous fluid filled chamber to generate a closed electrical connection between the sensing switch input connector and the sensing switch output connector of the viscous fluid filled pendulum impact sensing switch; the first pair of relay contacts being electrically wired in parallel with the manually operated flasher relay activation switch so as to bypass the manually operated flasher relay activation switch when the first pair of relay contacts are closed and supply power to the flasher relay activation input; the second pair of relay contacts being wired in series connection between a power source, a normally closed manual disable switch and the second latching input of the dual contact latching relay such that, once the second pair of contacts of the dual contact latching relay close, power is continuously supplied to the second latching input of the dual contact latching relay causing the first and second pairs of contacts to remain in the closed position until electrical power is interrupted to the second latching input by momentarily depressing the normally closed manual disable switch; the sensing switch input connector and sensing switch output connector being wired in series between a power source and the first latching input of the dual contact latching relay such that when the viscous fluid filled pendulum impact sensing switch senses an impact sufficient to form an electrical connection between the sensing switch input connector and sensing switch output connector power is momentarily supplied to the first latching input for a time sufficient to close the first and second pairs of relay contacts which remain closed until power is interrupted to the second latching input by momentarily depressing the normally closed manual disable switch.

Accordingly, an improved vehicle hazard light system for use with vehicles having a hazard light system that includes a number of emergency flasher lights controlled by a flasher relay that is activated by a manually operated flasher relay activation switch in connection with a flasher relay activation input of a flasher relay such that, when the manually operated flasher relay activation switch is in a closed position, power is supplied to the flasher relay activation input causing the flasher relay to supply power intermittently to the number of flasher lights such that the number of flasher lights flash on and off. Accordingly an improved hazard light system of the type described above is provided wherein the improvement to the vehicle hazard light system includes the addition of an impact activated latching relay assembly including: a dual contact latching relay having first and second latching inputs for closing and maintaining first and second pairs of relay contacts of the dual contact latching relay in closed positions while electrical power is supplied to either or both of the first and second latching inputs; and a viscous fluid filled pendulum impact sensing switch including a sensing switch input connector having a first end in connection in electrical connection with an electrically conductive pendulum that is swivelly, pivotally suspended in a non-electrically conductive viscous fluid filled chamber and surrounded by an electrically conductive ring positioned within the viscous fluid filled chamber and having a sensor switch output connector in electrical connection therewith and positioned within the viscous fluid filled chamber such that when an electrically conductive pendulum mass portion of the electrically conductive pendulum swings a predetermined angle away from a center hanging position in any direction an electrical connection is formed between the sensing switch input connector and the sensing switch output connector; the viscosity of the fluid in the viscous fluid filled chamber and the size and mass of the electrically conductive mass of the pendulum mass portion being selected to determine a magnitude of impact required to cause the electrically conductive pendulum to swing through the viscous fluid filled chamber to generate a closed electrical connection between the sensing switch input connector and the sensing switch output connector of the viscous fluid filled pendulum impact sensing switch; the first pair of relay contacts being electrically wired in parallel with the manually operated flasher relay activation switch so as to bypass the manually operated flasher relay activation switch when the first pair of relay contacts are closed and supply power to the flasher relay activation input; the second pair of relay contacts being wired in series connection between a power source, a normally closed manual disable switch and the second latching input of the dual contact latching relay such that, once the second pair of contacts of the dual contact latching relay close, power is continuously supplied to the second latching input of the dual contact latching relay causing the first and second pairs of contacts to remain in the closed position until electrical power is interrupted to the second latching input by momentarily depressing the normally closed manual disable switch; the sensing switch input connector and sensing switch output connector being wired in series between a power source and the first latching input of the dual contact latching relay such that when the viscous fluid filled pendulum impact sensing switch senses an impact sufficient to form an electrical connection between the sensing switch input connector and sensing switch output connector power is momentarily supplied to the first latching input for a time sufficient to close the first and second pairs of relay contacts which remain closed until power is interrupted to the second latching input by momentarily depressing the normally closed manual disable switch.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
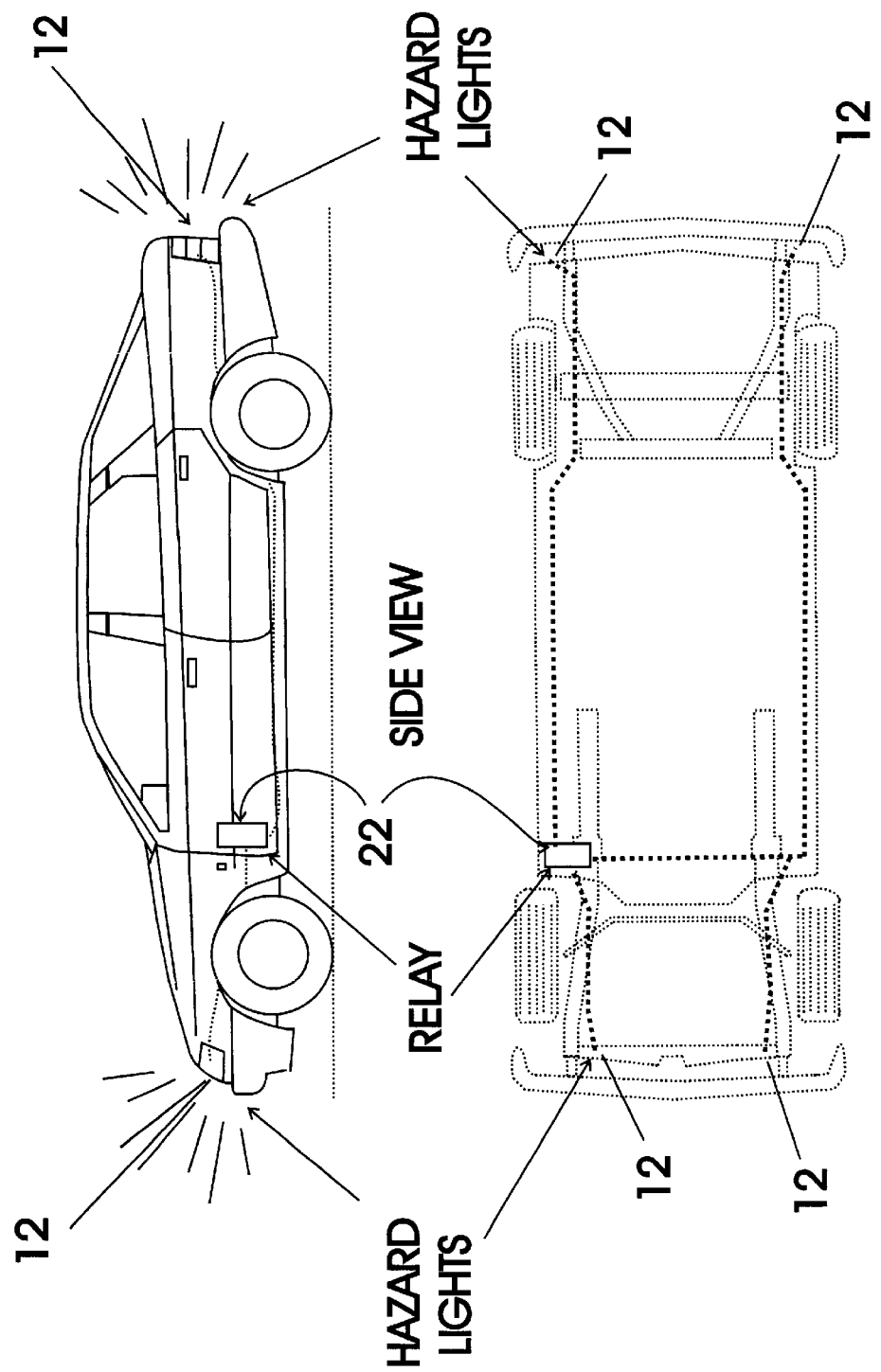
FIG. 1 is a schematic diagram of a representative vehicle with the improved vehicle hazard light system installed.
Figure 2:
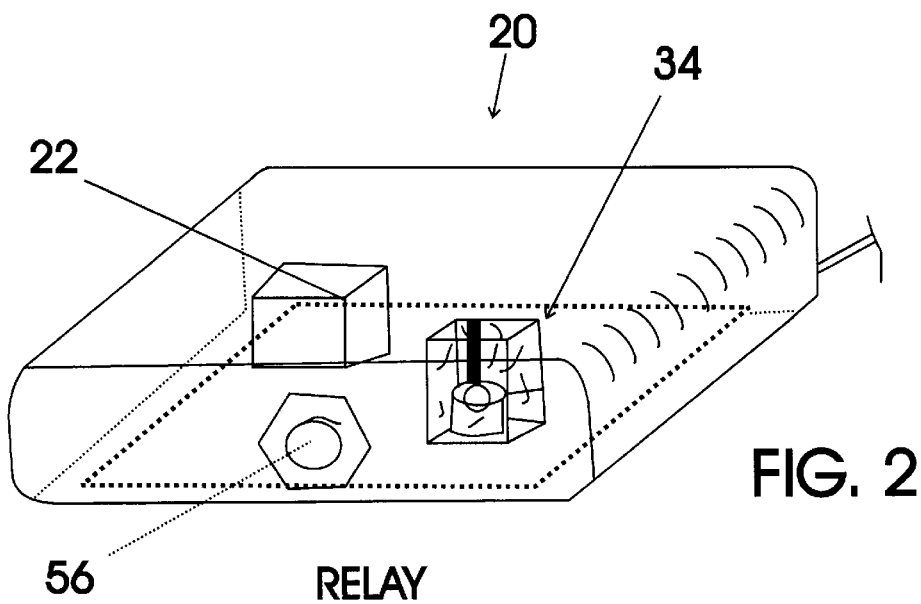
FIG. 2 is a cutaway view of the impact activated latching relay assembly of the improved vehicle hazard light system.
Figure 3:
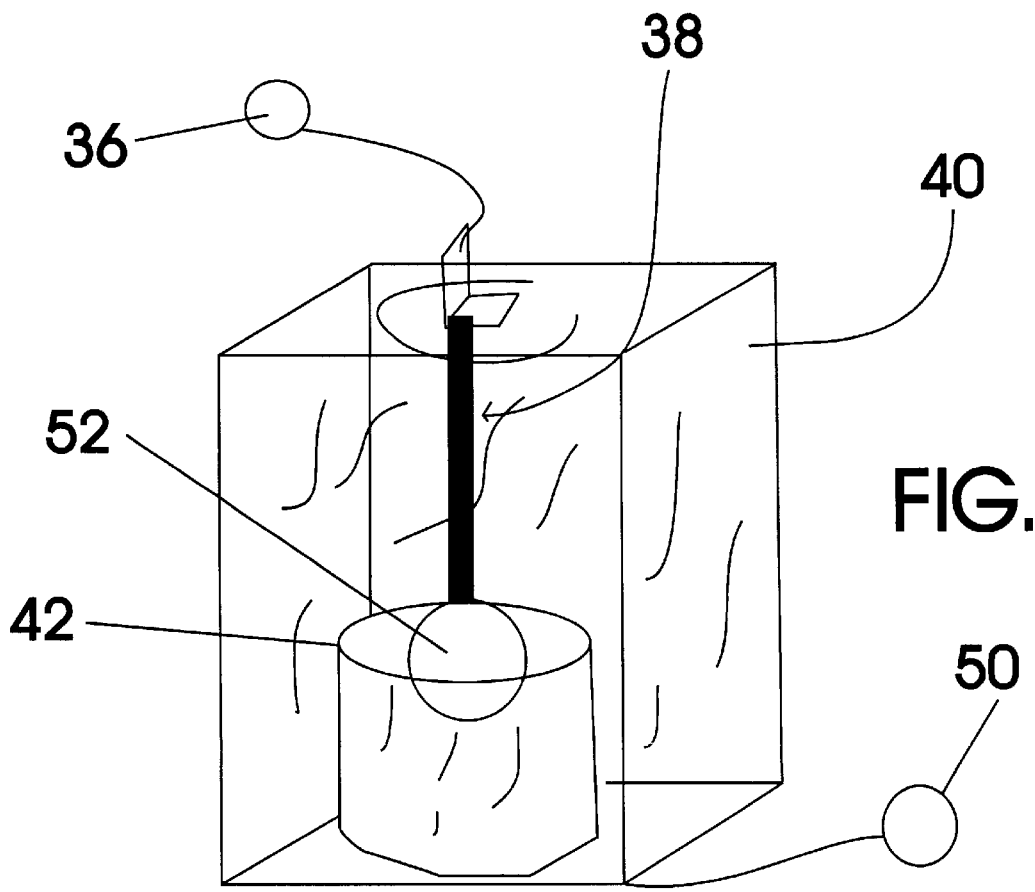
FIG. 3 is a cutaway view of the viscous fluid filled pendulum impact sensing switch.
Figure 4:
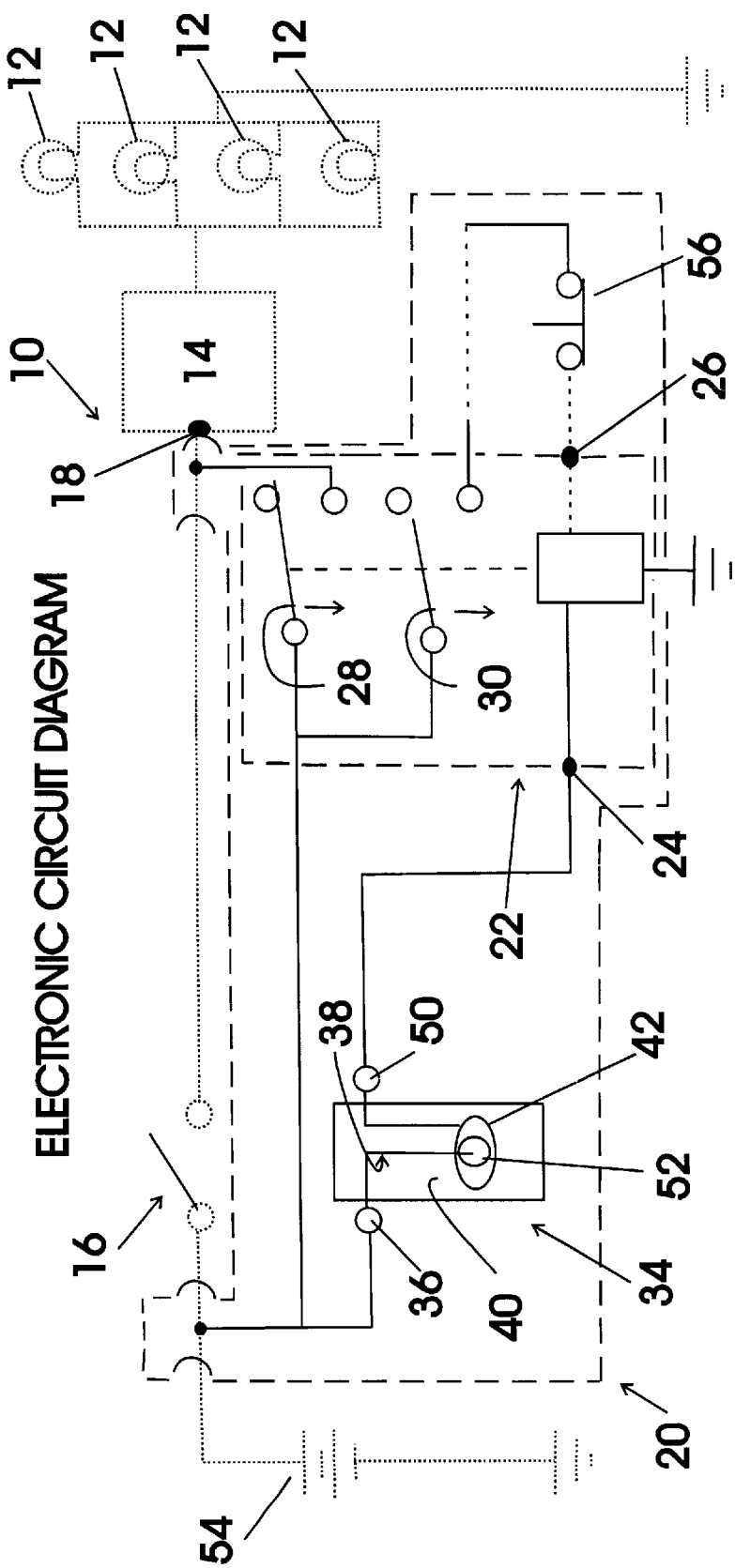
FIG. 4 is a schematic diagram of the improved vehicle hazard light system.

FIGS. 1–4 show various aspects of an improvement to a convention hazard light system, generally designated 10, that include a number of emergency flasher lights 12 controlled by a flasher relay 14 that is activated by a manually operated flasher relay activation switch 16. Manually operated flasher relay activation switch 16 is in connection with a flasher relay activation input 18 of flasher relay 14 such that, when the manually operated flasher relay activation switch 16 is in a closed position, power is supplied to flasher relay activation input 18 causing the flasher relay 14 to supply power intermittently to the number of flasher lights 12 such that the number of flasher lights 12 flash on and off.

The improvement to vehicle hazard light system 10 includes the addition of an impact activated latching relay assembly, generally designated 20 including: a dual contact latching relay, generally designated 22, having first and second latching inputs 24,26 for closing and maintaining first and second pairs of relay contacts 28,30 of dual contact latching relay 22 in closed positions while electrical power is supplied to either or both of first and second latching inputs 24,26; and a viscous fluid filled pendulum impact sensing switch, generally designated 34. Viscous fluid filled pendulum switch 34 includes a sensing switch input connector 36 having a first end in connection in electrical connection with an electrically conductive pendulum, generally designated 38, that is swivelly, pivotally suspended in a non-electrically conductive, viscous, silicone-based fluid filled chamber 40 and surrounded by an electrically conductive ring 42 positioned within viscous fluid filled chamber 40 and having a sensor switch output connector 50 in electrical connection therewith and positioned within the viscous fluid filled chamber 40 such that when an electrically conductive pendulum mass portion 52 of electrically conductive pendulum 38 swings a predetermined angle away from a center hanging position in any direction an electrical connection is formed between the sensing switch input connector 36 and the sensing switch output connector 50. The particular viscosity of the fluid in viscous fluid filled chamber 40 and the size and mass of the electrically conductive mass of the pendulum mass portion 52 is selected to determine a magnitude of impact required to cause the electrically conductive pendulum 38 to swing through the viscous fluid filled chamber 40 to generate a closed electrical connection between the sensing switch input connector 36 and the sensing switch output connector 50 of the viscous fluid filled pendulum impact sensing switch 20.

With reference now back to dual contact latching relay 22. First pair of relay contacts 28 are electrically wired in parallel with the manually operated flasher relay activation switch 16 so as to bypass the manually operated flasher relay activation switch 16 when the first pair of relay contacts 28 are closed. This bypass supplies electrical power to flasher relay activation input 18 just as if manually operated flasher relay activation switch 16 was manually closed and results in flasher relay 14 supplying power intermittently to the number of flasher lights 12 such that the number of flasher lights 12 flash on and off in the normal fashion.

Second pair of relay contacts 30 are wired in series connection between a power source 54 such as the vehicle battery, a normally closed, manual disable switch 56 and the second latching input 26 of dual contact latching relay 22 such that, once the second pair of contacts 30 of dual contact latching relay 22 close, electrical power is continuously supplied to second latching input 26 of dual contact latching relay 26 causing first and second pairs of contacts 28,30 to remain in the closed position until electrical power is interrupted to second latching input 26 by momentarily depressing normally closed manual disable switch 56.

Sensing switch input connector 36 and sensing switch output connector 50 are wired in series between power source 54 and first latching input 24 of dual contact latching relay 22 such that when the viscous fluid filled pendulum impact sensing switch 34 senses an impact sufficient to form an electrical connection between the sensing switch input connector 36 and sensing switch output connector 50 electrical power from power source 54 is momentarily supplied to first latching input 24 for a time sufficient to close the first and second pairs of relay contacts 28,30 which remain closed until power is interrupted to second latching input 26 by momentarily depressing normally closed manual disable switch 56 as previously described.

It can be seen from the preceding description that an improved vehicle hazard light system has been provided.

It is noted that the embodiment of the improved hazard light system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claim is:

1. In a vehicle hazard light system including a number of emergency flasher lights controlled by a flasher relay that is activated by a manually operated flasher relay activation switch in connection with a flasher relay activation input of a flasher relay such that, when the manually operated flasher relay activation switch is in a closed position, power is supplied to the flasher relay activation input causing the flasher relay to supply power intermittently to the number of flasher lights such that the number of flasher lights flash on and off; the improvement comprising:

an impact activated latching relay assembly;

said impact activated latching relay assembly including:

a dual contact latching relay having first and second latching inputs for closing and maintaining first and second pairs of relay contacts of said dual contact latching relay in closed positions while electrical power is supplied to either or both of said first and second latching inputs; and a viscous fluid filled pendulum impact sensing switch including a sensing switch input connector having a first end in connection in electrical connection with an electrically conductive pendulum that is swivelly, pivotally suspended in a non-electrically conductive viscous fluid filled chamber and surrounded by an electrically conductive ring positioned within said viscous fluid filled chamber and having a sensor switch output connector in electrical connection therewith and positioned within said viscous fluid filled chamber such that when an electrically conductive pendulum mass portion of said electrically conductive pendulum swings a predetermined angle away from a center hanging position in any direction an electrical connection is formed between said sensing switch input connector and said sensing switch output connector; the viscosity of said fluid in said viscous fluid filled chamber and the size and mass of said electrically conductive mass of said pendulum mass portion being selected to determine a magnitude of impact required to cause said electrically conductive pendulum to swing through said viscous fluid filled chamber to generate a closed electrical connection between said sensing switch input connector and said sensing switch output connector of said viscous fluid filled pendulum impact sensing switch;

said first pair of relay contacts being electrically wired in parallel with the manually operated flasher relay activation switch so as to bypass the manually operated flasher relay activation switch when said first pair of relay contacts are closed and supply power to said flasher relay activation input;

said second pair of relay contacts being wired in series connection between a power source, a normally closed manual disable switch and said second latching input of said dual contact latching relay such that, once said second pair of contacts of said dual contact latching relay close, power is continuously supplied to said second latching input of said dual contact latching relay causing said first and second pairs of contacts to remain in said closed position until electrical power is interrupted to said second latching input by momentarily depressing said normally closed manual disable switch;

said sensing switch input connector and sensing switch output connector being wired in series between a power source and said first latching input of said dual contact latching relay such that when said viscous fluid filled pendulum impact sensing switch senses an impact sufficient to form an electrical connection between said sensing switch input connector and sensing switch output connector power is momentarily supplied to said first latching input for a time sufficient to close said first and second pairs of relay contacts which remain closed until power is interrupted to said second latching input by momentarily depressing said normally closed manual disable switch.

* * * * *